US008152621B2

(12) United States Patent
Michels

(10) Patent No.: US 8,152,621 B2
(45) Date of Patent: Apr. 10, 2012

(54) GAMING APPARATUS AND METHOD WITH FULL-MOTION VIDEO CHARACTERS

(75) Inventor: Steven R. Michels, Seattle, WA (US)

(73) Assignee: Fantasy Bandits, LLC, Brownsville, WI (US)

( * ) Notice: Subject to any disclaimer, the term of this patent is extended or adjusted under 35 U.S.C. 154(b) by 504 days.

(21) Appl. No.: 12/365,788

(22) Filed: Feb. 4, 2009

(65) Prior Publication Data

US 2009/0197669 A1 Aug. 6, 2009

Related U.S. Application Data

(60) Provisional application No. 61/026,404, filed on Feb. 5, 2008.

(51) Int. Cl.
*A63F 13/00* (2006.01)

(52) U.S. Cl. .......................................................... 463/16

(58) Field of Classification Search .................... 463/16, 463/20

See application file for complete search history.

(56) References Cited

U.S. PATENT DOCUMENTS

| | | | | |
|---|---|---|---|---|
| 6,578,847 | B1 | 6/2003 | Hedrick et al. | |
| 2003/0069057 | A1 | 4/2003 | DeFrees-Parrott | |
| 2004/0087359 | A1* | 5/2004 | Cuddy et al. | 463/20 |
| 2005/0054423 | A1* | 3/2005 | Wadleigh | 463/20 |
| 2006/0160590 | A1 | 7/2006 | Okada | |
| 2006/0287064 | A1* | 12/2006 | Inamura | 463/20 |
| 2007/0259713 | A1 | 11/2007 | Fiden et al. | |
| 2008/0004093 | A1 | 1/2008 | Van Luchene et al. | |
| 2008/0102923 | A1 | 5/2008 | Esses et al. | |
| 2008/0125221 | A1 | 5/2008 | Ward et al. | |

OTHER PUBLICATIONS

Supplementary European Search Report and Search Opinion for European Patent Application No. 09707205.2, mail date Apr. 27, 2011, 5 pages.

http://urc.sakura.ne.jp/hp/playroom/slot_m/ believed to be available by Nov. 8, 2004, 8 pages, cited in International Search Report and received from ISA on Sep. 14, 2009.

International Search Report and Written Opinion for International Patent Application No. PCT/US2009/033107, mailed Sep. 9, 2009, 11 pages.

* cited by examiner

*Primary Examiner* — Thomas L Dickey

(74) *Attorney, Agent, or Firm* — Foley & Lardner LLP

(57) ABSTRACT

One embodiment relates to a gaming apparatus. The gaming apparatus includes an electronic display and a circuit configured to control the electronic display and to cause the electronic display to display a graphical scene. The graphical scene includes a first portion having a first video corresponding to a first body portion of one of a number of characters, a second portion having a second video corresponding to a second body portion of one of the number of characters, and a third portion having a third video corresponding to a third body portion of one of the number of characters.

16 Claims, 9 Drawing Sheets

GAMING APPARATUS AND METHOD WITH FULL-MOTION VIDEO CHARACTERS

CROSS-REFERENCE TO RELATED APPLICATIONS

The present application claims the benefit of U.S. Provisional Patent Application No. 61/026,404, filed Feb. 5, 2008, the entirety of which is hereby incorporated by reference.

BACKGROUND

The present application relates generally to the field of gaming systems. More specifically, the invention relates to a video slot machine or other games of chance.

Slot machines typically include three or more reels that spin when a user enters money and starts the machine by, for example, pulling a lever provided on the side of the machine. The reels spin, then stop to reveal one of several symbols on the reel. By matching symbols on the reels, a user may win a prize. The reels are generally arranged horizontally and include brightly colored and easily recognizable symbols such as images of fruits or simple shapes such as bells, diamonds, or hearts. Video slot machines substitute mechanical reels for scrolling portions on a video screen. If a user matches the symbols on the reels, they may be allowed to use the winnings to try again or "press the bet" to win a larger prize.

SUMMARY

One embodiment relates to a gaming apparatus. The gaming apparatus includes an electronic display and a circuit configured to control the electronic display and to cause the electronic display to display a graphical scene. The graphical scene includes a first portion including video corresponding to a first body portion of one of a number of characters, a second portion including video corresponding to a second body portion of one of the number of characters, and a third portion including video corresponding to a third body portion of one of the number of characters. The circuit is configured to at least one of spin, randomize, and jumble different possible videos for each of the first, second, and third portions. The circuit is further configured to enter a winning state when the video shown in the first, second, and third portions are associated with the same character wearing matching clothing.

Another embodiment relates to a method of providing a game of chance via a graphical scene shown on an electronic display. The method includes providing a first video on a first portion of the graphical scene, the first video corresponding to a first body portion of a model. The method further includes providing a second video on a second portion of the graphical scene, the second video corresponding to a second body portion of the model. The method yet further includes providing a third video on a third portion of the graphical scene, the third video corresponding to a third body portion of the model. The method yet further includes providing an indication of a winner if the first video, the second video, and third video are associated with a similar costume theme.

Another embodiment relates to a device connected to a display. The device includes a circuit configured to cause a character to be displayed on the display wearing multiple pieces of clothing, wherein the circuit is configured to vary the pieces of clothing shown on the character when a game is played. The circuit is further configured to enter a win routine for the game when the pieces of clothing shown on the character match once the varying of the pieces of clothing is discontinued.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE PREFERRED EMBODIMENTS

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
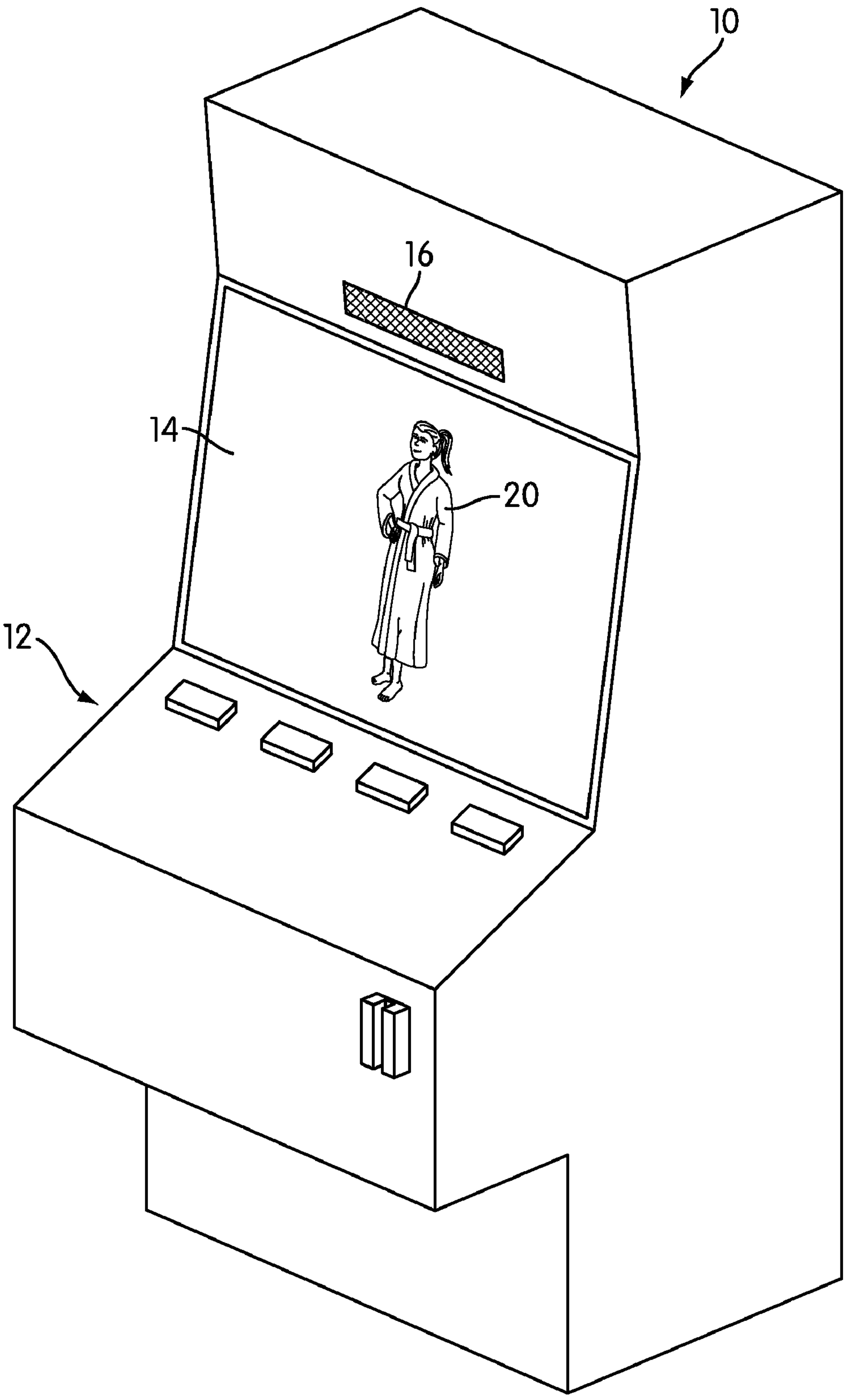
FIG. 1 is a front view of a gaming apparatus such as a slot machine, according to an exemplary embodiment.

Referring to FIG. 1, a gaming apparatus 10 can be a slot machine or similar device. Apparatus 10 can generally be a game of chance and can include a multitude of graphic images (e.g., screen shots, video shots, pictures, etc.) or representations thereof. A player pays money (or some other form of credits) to play the game, which includes a circuit configured in one or more modules (e.g., software and/or hardware) and to rotate or otherwise jumble the graphics. If the graphic images line up in some predetermined pattern, the player wins. According to an exemplary embodiment, gaming apparatus 10 includes a user interface 12 and a display 14. Gaming apparatus 10 may include a slot to receive coins and/or tokens or a magnetic reader to accept credit cards or other items with a magnetic strip. Gaming apparatus 10 can also include an account login feature that allows a user to log into gaming apparatus 10 with account information (e.g., a username and password) to access pre-stored money or credits (e.g., a player's club account, a credit card associated with a hotel room, etc.).

User interface 12 allows a player to start and otherwise control gaming apparatus 10 and select various options (e.g., number of credits to wager, the gender of the model or character, etc.). As shown in FIG. 1, interface 12 includes a multitude of buttons provided below display 14. According to other exemplary embodiments, user interface 12 may include a traditional lever, or any other suitable tactile input device. User interface 12 may be integrated with display 14 (e.g., a touch screen) or may be provided separately from display 14 as shown in FIG. 1. User interface 12 can be a single user interface element (e.g., a single lever or button) or include a plurality of user interface elements.

According to an exemplary embodiment, gaming apparatus 10 operates as a video slot machine and display 14 is configured to show graphical representations of three or more "reels" (e.g., screen portions, screens, etc.). As described below, display 14 changes depending on whether the machine is idle, in use, or in play. While most slot machines include reels with various symbols such as images of fruits or simple shapes such as bells, diamonds, or hearts, gaming apparatus 10 includes images of models or other characters. The models can be clothed in various sets of clothing. Gaming apparatus 10 can be configured to allow a player to win by completing a set of clothing.

Figure 2:
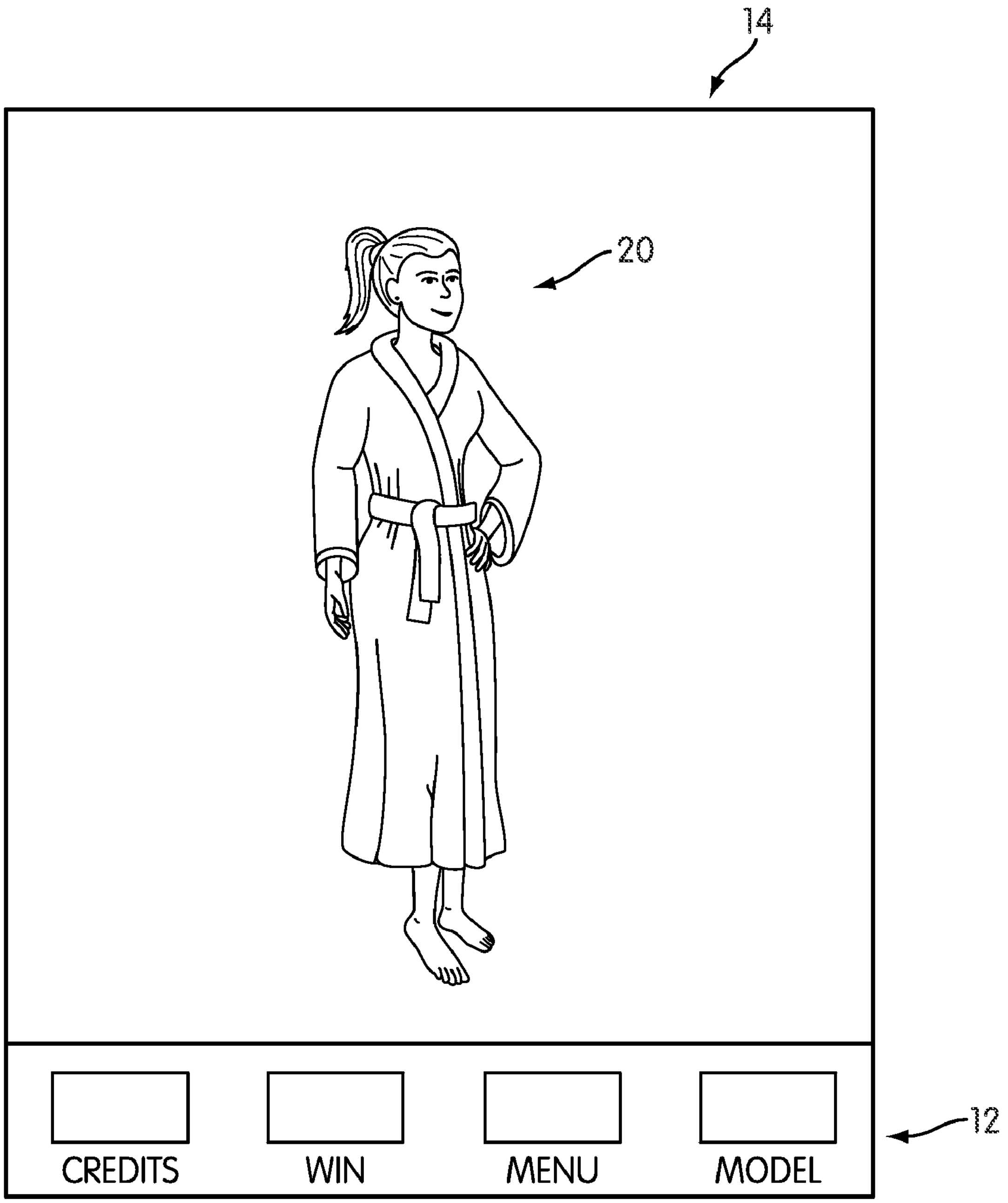
FIG. 2 is a view of a display for the slot machine of FIG. 1 in a first or idle mode, according to an exemplary embodiment.

Referring also to FIG. 2, in an idle mode, when no one is playing, display 14 shows static images or video of a model 20 (e.g., video of a real person) in a bathrobe or other clothing. Model 20 may stand still, dance, shift his or her weight, look bored, or may otherwise be moving or stationary. Audio may be periodically played through an audio system 16 to encourage a user to play. The audio may match the static images or video of model 20. Model 20 may be one of several male or female models that a user can choose from when playing gaming apparatus 10. The choice regarding model 20 can be made at the beginning of a user's gaming session, between tries at the game, or otherwise, based on inputs received from user input device 12. According to an exemplary embodiment, different models are associated with different bets. In yet other exemplary embodiments, different models are associated with different potential pay-outs or odds of winning.

Figure 3:
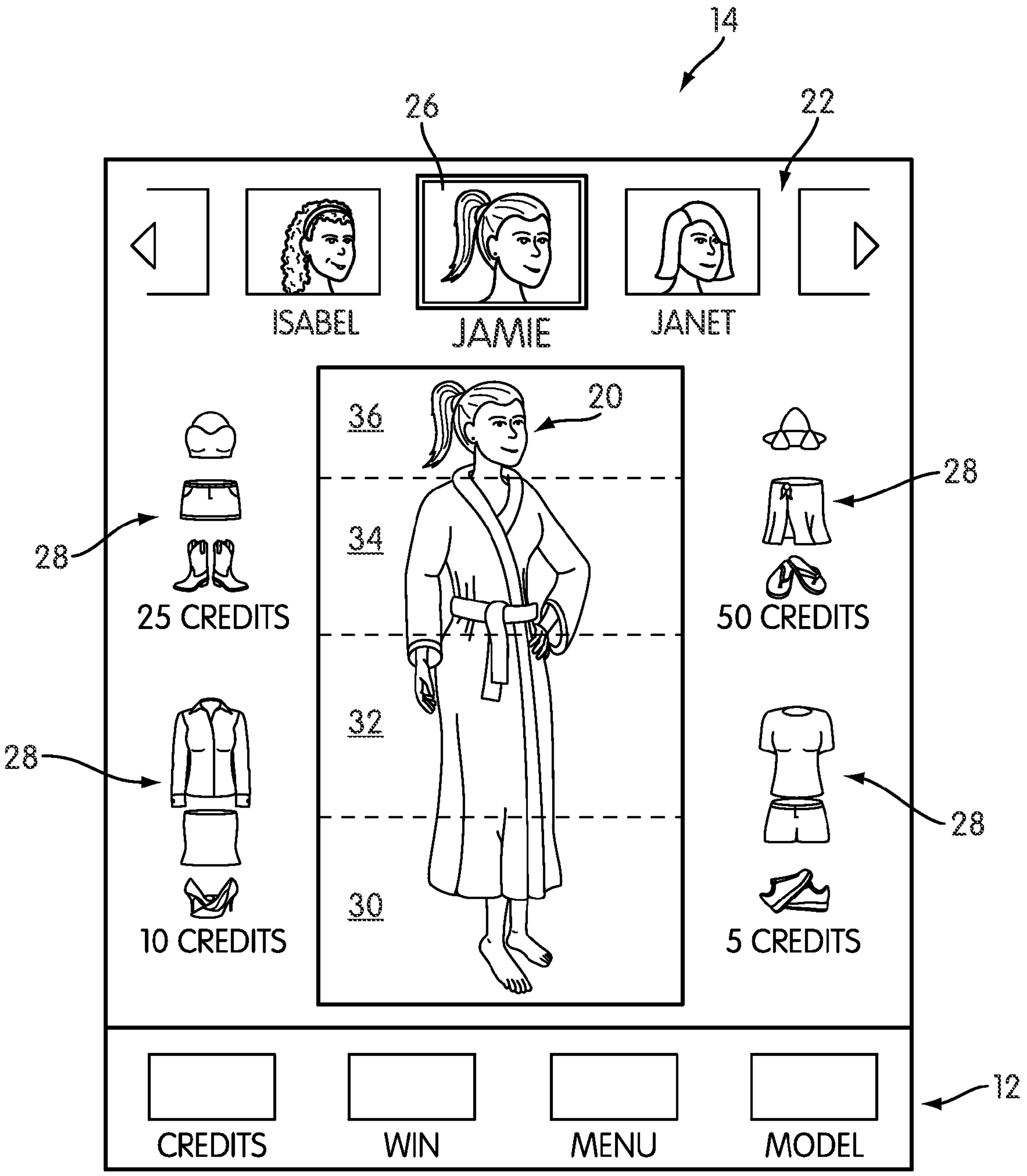
FIG. 3 is a view of a display for the slot machine of FIG. 1 in a second or selection mode, according to an exemplary embodiment.
Figure 4:
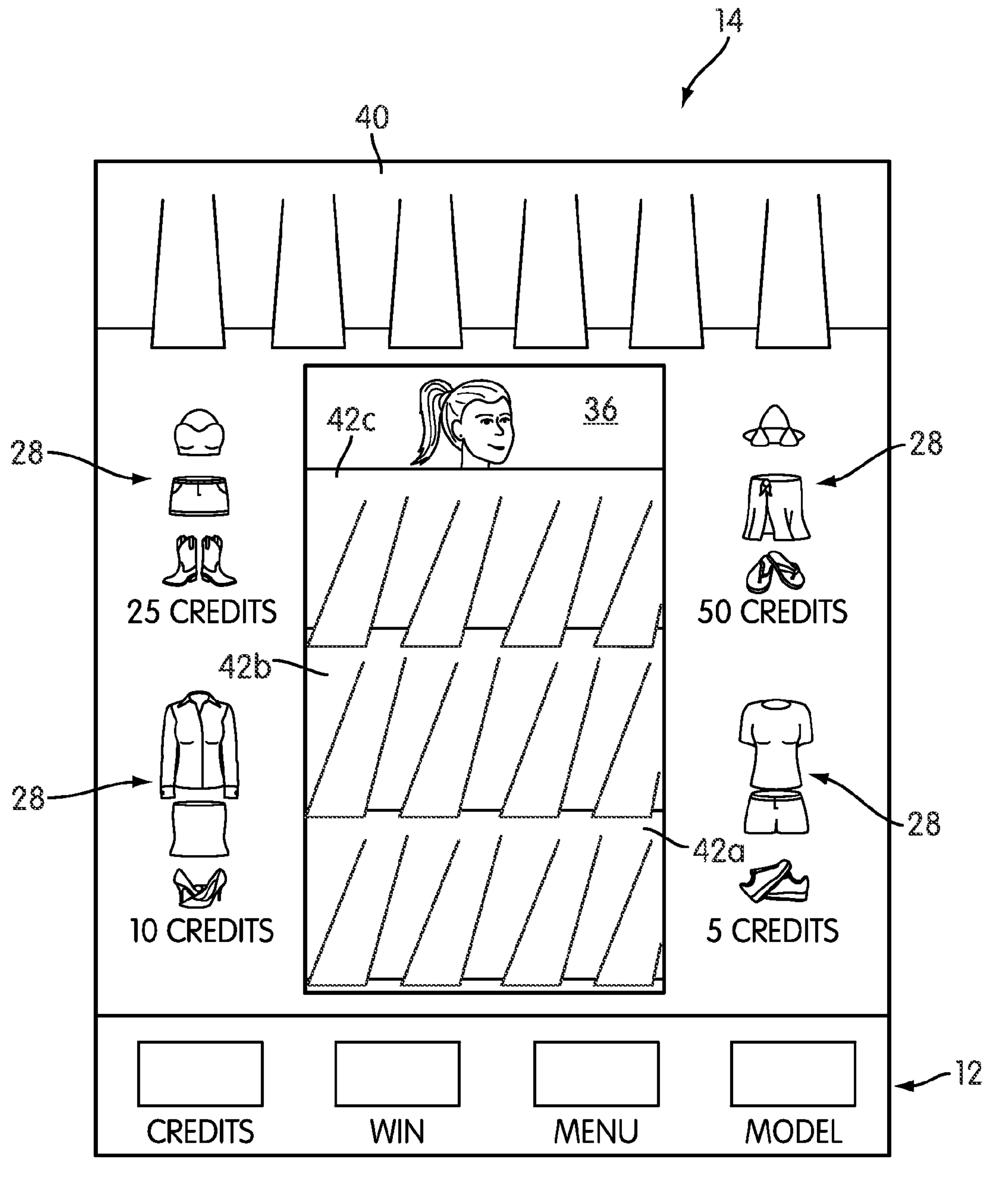
FIGS. 4-7 are views of a display for the slot machine of FIG. 1 in a third or play mode, according to an exemplary embodiment.

As shown in FIG. 3, display 14 enters a selection mode when a player begins playing. The selection mode may be triggered, for example, by a player inserting coins or tokens into the machine, a player sitting down at the machine (e.g., based on a signal from a human detection sensor, such as a seat contract switch, capacitive sensor, etc.), or a player pushing any button on interface 12. In the selection mode, display 14 shows more information than in the idle mode.

A portion of display 14, for example, the top of display 14, displays a menu 22 of available characters based on character data retrieved from a memory device. According to an exemplary embodiment, menu 22 includes a multitude of headshots for the various models a user may play with. A user may select a model with a touch screen interface or additional buttons provided proximate to menu 22. Menu 22 may include more models than can be shown on display 14 at once and scroll buttons 23 may be provided to allow a user to view additional models. According to one exemplary embodiment, one model 26 in menu 22 (e.g., the model located in the center of the menu) is highlighted. The highlighted model 26 corresponds to the model 20 shown on a center portion of display 14. By scrolling through menu 22, a user changes the highlighted model 26 and is able to preview the various models before choosing a model with which to play the game.

A portion of display 14, for example, the sides of display 14, shows a multitude of winning combinations 28. According to an exemplary embodiment, winning combinations 28 are matching sets of three pieces of clothing (e.g., cowboy/cowgirl costumes, beach/swim wear, sport wear, formal wear, lingerie, etc.). Prize values (e.g., the number of coins or credits a player can win) may be displayed along with each of the matching sets of clothing. The winning combinations 28 are configured to be distinct from each other (e.g., displayed separately) such that a user can easily determine whether a winning combination 28 has been achieved during play. The possible pieces of clothing may have a similar theme for both male and female models or may be provided for only the male or female models.

A central portion of display 14 shows a model 20 in a bathrobe or other clothing, similar to the idle mode. According to an exemplary embodiment, the central portion of display 14 is divided to include a first portion 30, a second portion 32, a third portion 34, and a fourth portion 36. In an alternative embodiment, only one portion, a plurality of portions, or more than five portions may be provided for variable or interchangeable display at each portion. A dividing line (e.g., a dotted line, etc.) or other graphical boundary may be shown between the portions, or the divisions may become clear only when the portions begin changing. According to yet other exemplary embodiments, a division between the portions is not visible or does not exist. The first portion 30, second portion 32, third portion 34, and fourth portion 36 are configured to align with the image of the model such that first portion 30 shows the model's lower legs and feet, second portion 32 shows the model's mid-section, third portion 34 shows the model's upper torso, and fourth portion 36 shows the model's head. Each of the first 30, second 32, and third 34 portions correspond with one of the three pieces of clothing in the matched sets 28 that are revealed and/or varied when gaming apparatus 10 is played. It should be noted that more or fewer portions may be provided, according to various exemplary embodiments.

Figure 5:
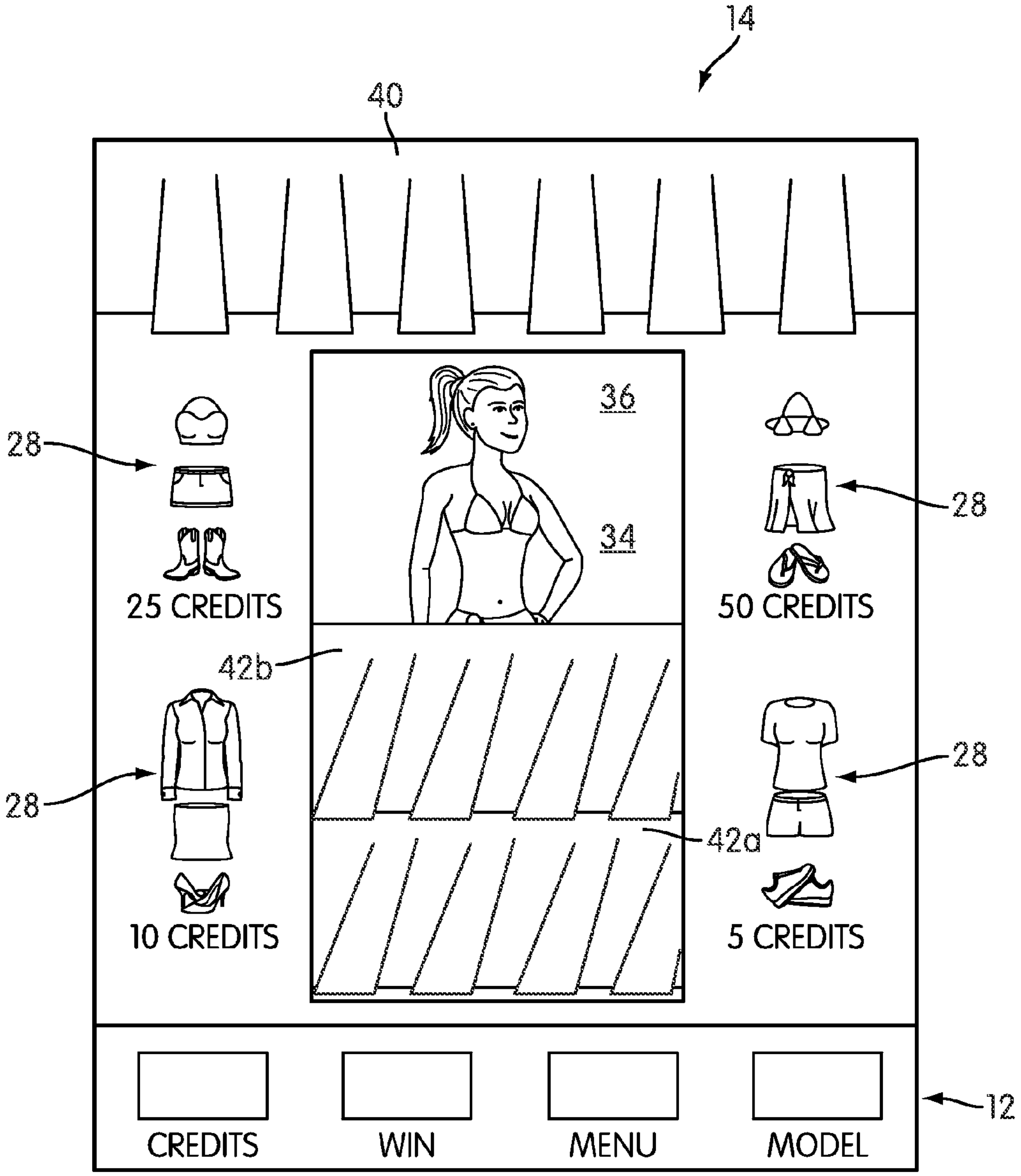
Figure 6:
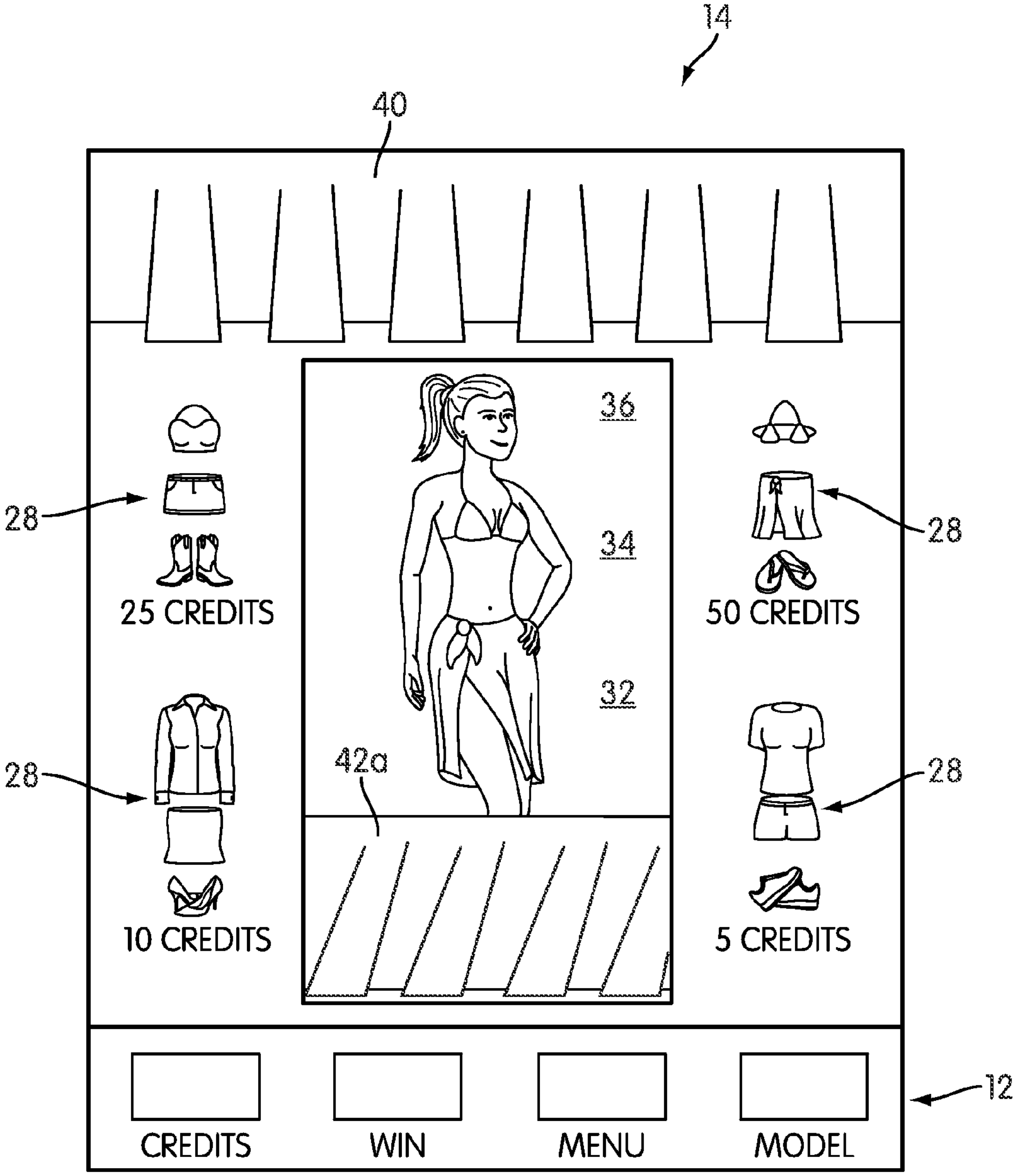
Figure 7:
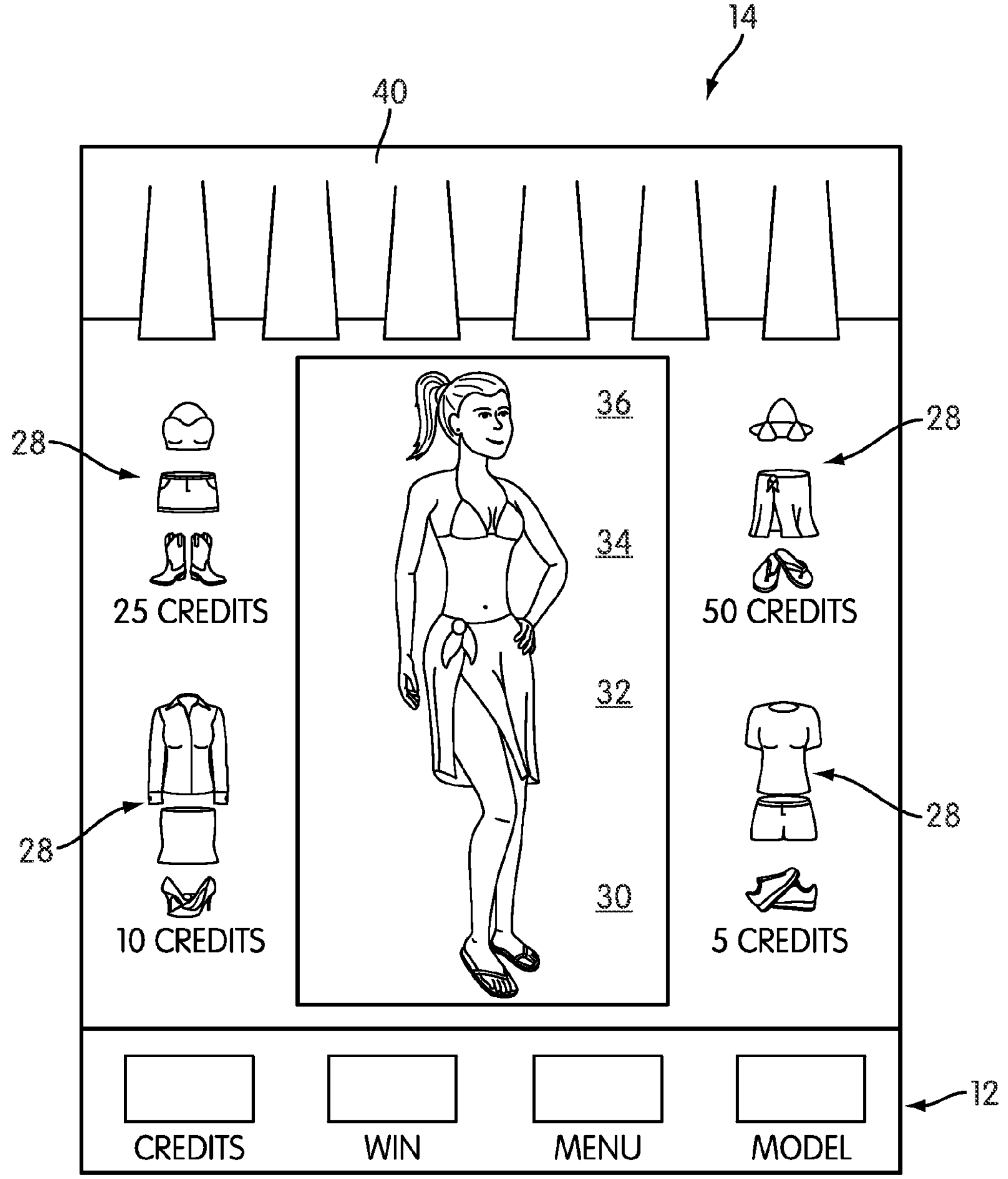

As shown in FIGS. 4-7, when a user begins play the game (e.g., after using user interface 12 to select the model and/or to otherwise trigger the beginning of the game), display 14 enters a play mode. The user begins play by selecting a model and pressing a spin button or otherwise activating a user interface element (e.g., by pulling a lever, by touching a touch-screen area, etc.). Once play is begun, a curtain 40 or other obstruction can cover or obscure menu 22 (e.g., menu 22 can be removed from the screen), such as by displaying a curtain or other obstruction instead of the portion of the character to create the impression of being covered. Curtains 42*a*-42*c* can also cover first portion 30, second portion 32, and third portion 34 of the model, leaving fourth portion 36 uncovered. Curtains 42*a*-42*c* may be animated to move across the central portion of display 14 horizontally and/or vertically such that first portion 30, second portion 32, and third portion 34 correspond to the reels on traditional slot machines. Alternative animation schemes are possible (e.g., spinning cubes, spinning shapes, morphing shapes, morphing images, vertical shades, blinds, etc.). FIG. 5 shows display 14 with curtain 42*c* retracted to reveal an image of the model's upper torso with a first piece of clothing in third portion 34. FIG. 6 shows display 14 with curtain 42*b* retracted to reveal an image of the model's mid-section with a second piece of clothing in second portion 32. FIG. 7 shows display 14 with curtain 42*a* retracted to reveal an image of the model's legs with a third piece of clothing in first portion 30. As curtains 42*a*-42*c* are displayed and moving, the model may offer words of encouragement to the user via a speaker and/or corresponding video or images.

It should be noted that each portion of the display that shows one or more body portions of the one or more characters may be full-motion video of an actual human actor. The full-motion video may be stopped or paused during one or more activities of the system in response to one or more events. According to an exemplary embodiment, the full-motion video may continue throughout all or most stages or activities of the gaming apparatus so that playing the game appears to be a simulation of interaction with a real human. For example, when the curtains are moved over the character, full-motion video of the character appearing to change behind the curtains (e.g., throwing her robe over the curtain, etc.) may continue to play. It should be appreciated that in some embodiments the curtains may not be provided and that full motion video of a character changing from a robe into a matched (or mismatched) outfit may be provided as a part of the game (e.g., in response to a pull of the lever to start the game, etc.).

In one embodiment, curtains 42*a*, 42*b*, and 42*c* are "retracted" in order (e.g., by displaying a portion of the model with the clothing data (e.g., video, images) received from a randomizer or jumbling module). Alternatively, a preset order or random order may be utilized. Curtains 42*a*, 42*b*, and 42*c* may be revealed simultaneously or sequentially. In one embodiment, the user can select with a button which curtain is revealed.

If the images (e.g., videos) revealed by curtains 42*a*-42*c* are a matched set shown as one of the winning combinations 28 on display 14, the user wins the amount listed for that winning combination 28. A control circuit is configured to calculate a credit for the user and to store the credit in memory. Credits can be added by the control circuit to a user's account card, a user's account on a network, or otherwise added to an account. A control circuit can also be configured to cause the dispensing of coins that have collected in the machine or by any other mechanism. Further, the model 20 may celebrate and perform an action that is appropriate for the theme of the clothing. For example if the matched set of clothing is a cowboy/cowgirl costume, the model may slap his or her boot or if the matched set of clothing is swim/beach wear, the model may put on sunglasses. The celebration may be relatively short in duration (e.g., less than thirty seconds, less than fifteen seconds, less than give second, etc.) to minimize the amount of non-gaming action for gaming apparatus 10. In other exemplary embodiments, the model may perform an activity or celebration that rewards the user and is longer in duration (e.g., perform an entertaining dance, which may be more than fifteen seconds, thirty seconds, sixty seconds, etc.).

Figure 8:
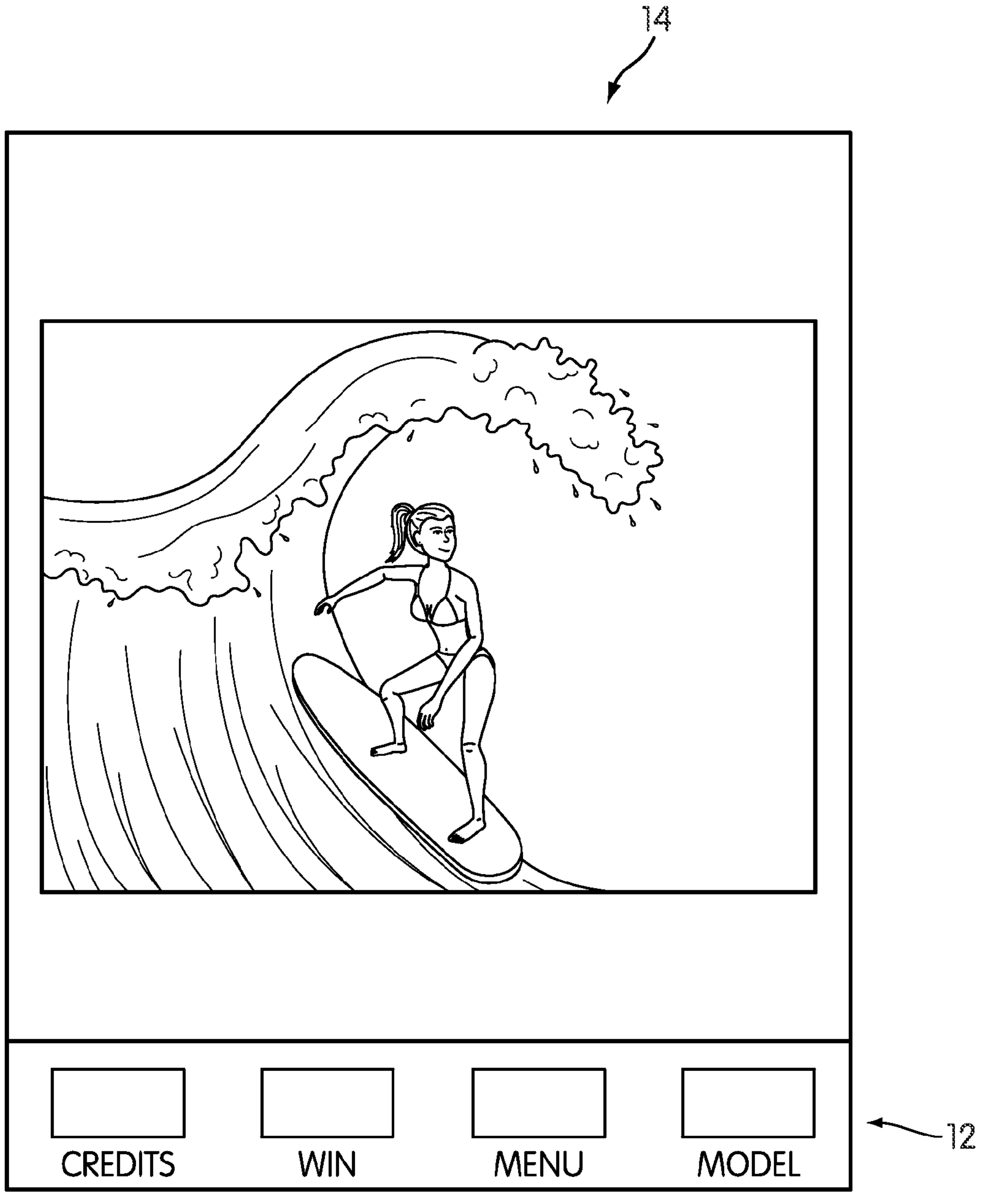
FIG. 8 is a view of a display for the slot machine of FIG. 1 showing a bonus mode, according to an exemplary embodiment.

As shown in FIG. 8, if a user is able to obtain a winning combination 28 (e.g., one time or several times in a row), they may "press the bet" to win more credits by having the model perform some activity that is related to the matched set of clothing 28. For example, a model in a cowboy/cowgirl costume may ride a bull or a model in swim/beach wear may ride a wave on a surfboard. The duration of time the model performs the action determines the amount of additional winnings the user collects. The gaming apparatus can be configured to automatically conduct this activity upon revealing a winning combination 28 or the user may control this activity (e.g., the user selects a button that says "ride the wave for a bonus and bet again!").

To help promote the slot machines and attract new models, gaming apparatus 10 may be configured to tabulate (e.g., by storing statistics in memory) the number of times each model's image is used to play a game by a user. The model may then receive a royalty payment for use of their likeness.

Figure 9:
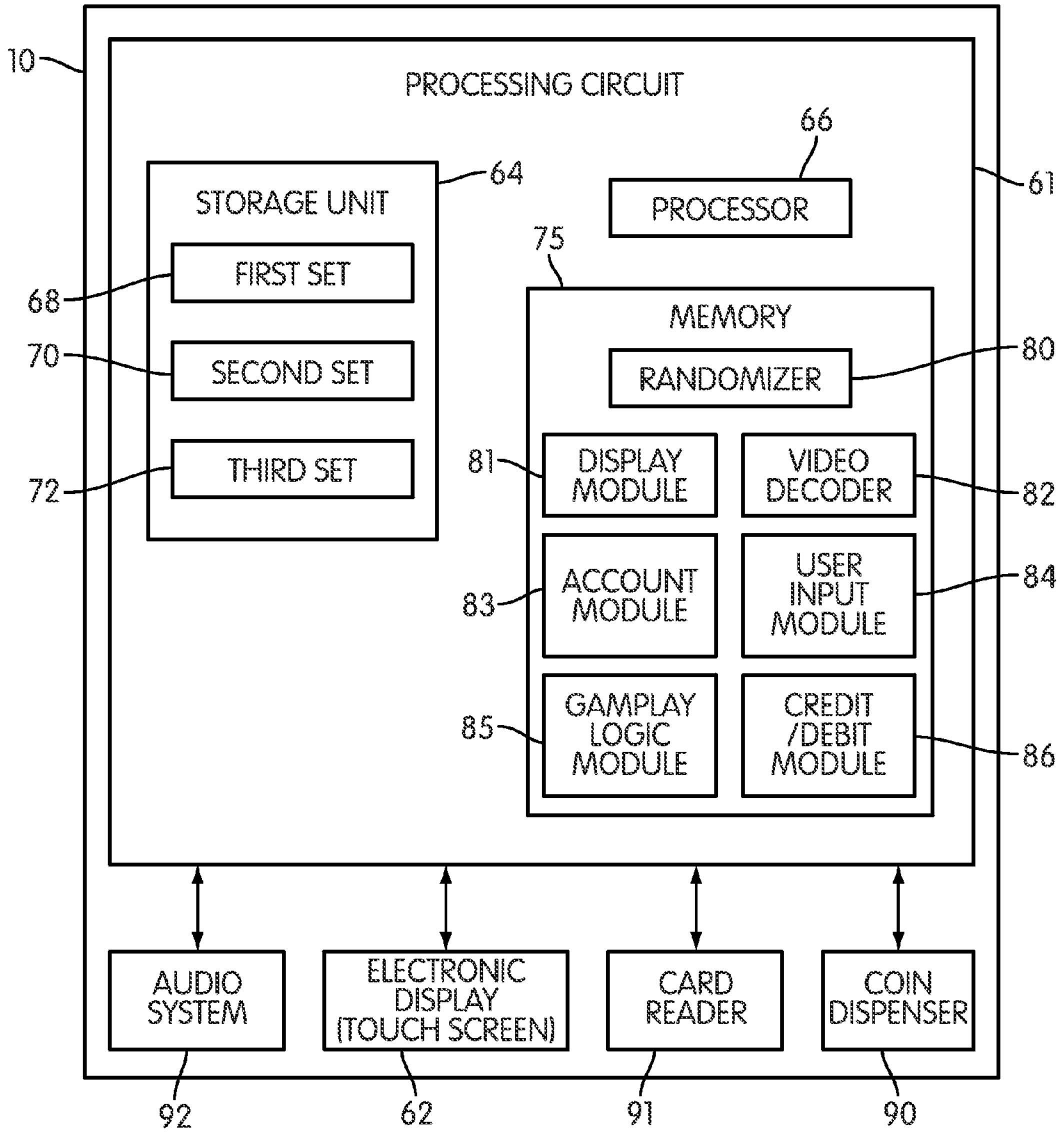
FIG. 9 is a block diagram of an apparatus for use with the display system of FIG. 1, according to an exemplary embodiment.

Referring now to FIG. 9, a block diagram of gaming apparatus 10 is shown, according to an exemplary embodiment. Gaming apparatus 10 includes processing circuit 61 configured to provide output to and to receive input from electronic display 62 (e.g., electronic display 62 being a touch screen). In embodiments where electronic display 62 is not a touch screen, processing circuit 61 may be configured to receive input from one or more user interface elements (e.g., buttons, levers, etc.) provided to a user of gaming apparatus 10. Processing circuit 61 is shown to include a storage unit 64 and a processor 66. Storage unit 64 may include one or more memory devices (e.g., RAM, ROM, disk-based storage, an optical drive and disk, flash memory storage, solid state storage, network storage, network storage via a server computer, etc.) configured to store data/information for recall and use by processor 66. For example, storage unit 64 may be configured to store images (e.g., image files, video files, digital video, etc.). In some embodiments, storage unit 64 can store a first set of first images 68 associated with a first body portion 30 in a plurality of costumes, a second set of second images 70 associated with a second body portion 32 in the plurality of costumes, and a third set of third images 72 associated with a third body portion 34 in the plurality of costumes. The set of images 68-72 are stored for each model or character. Each of the images or video may be captured video or images of real items and/or characters, and/or may be computer-generated video or images (e.g., cartoon images, three-dimensional renderings, etc.), or a combination thereof.

Referring still to FIG. 9, processing circuit 61 can be configured to control electronic display 62 and to cause the electronic display 62 to display a graphical scene. In other words, processing circuit 61 can be configured to control the gaming apparatus and electronic display 62 in particular to conduct each of the activities described herein (e.g., with reference to FIGS. 1-9). The graphical scene can have a first portion including a first image corresponding to a first body portion of one of a number of characters, a second portion including a second image corresponding to a second body portion of one of the number of characters, and a third portion including a third image corresponding to a third body portion of one of the number of characters. Processor 66 can be an application specific integrated circuit (ASIC), a general purpose processor, a specific purpose processor, more than one processors configured to work together, or any other suitable processing part. Processing circuit 61 can be integrated on a printed circuit board, implemented on multiple circuit boards, formed over a network (e.g., the storage unit being remote from the processor) or otherwise implemented. According to an exemplary embodiment, storage unit 64 stores computer code for executing and/or facilitating the steps described herein and processor 66 is configured to execute the computer code stored in storage unit 64. Accordingly, the activities described herein can be implemented in software so that when the computer code is executed the gaming apparatus is configured to conduct the specific activities.

According to an exemplary embodiment, processing circuit 61 can include a number of software and/or hardware modules configured to execute and/or facilitate the execution of the activities described herein. In FIG. 9, modules 80-86 are shown in memory 75. Modules 80-86 may be computer code, object code, script code, an executable, and/or any other software or hardware that configures processing circuit 61 to conduct one or more activities. It should be noted that memory 75 may be the same or different than storage unit 64. For example, storage unit 64 may be disk storage while memory 75 is solid state memory. Referring to modules 80-86, randomizer 80 may be configured to randomize, jumble, or otherwise vary the video and/or images provided to electronic display 62 while the game is active. Randomizer 80 may include a random number generator (e.g., providing a truly random outcome) or different outcomes can be varied based on a weighted function or another algorithm that provides a quasi-random outcome. The output from the randomizer may be used to select one or more first, second, third sets of video/images from storage unit 64. Display module 81 may be configured to drive and/or otherwise control electronic display 62 (e.g., to expose application programming interfaces or other functions of electronic display 62 to the other modules or components of processing circuit 61). Video decoder 82 may include decoding logic for the playback of video and/or images stored in storage unit 64. For example, the video stored in storage unit 64 may be compressed using, for example, an MPEG4 or DIVX format and video decoder 82 may be configured to decompress and otherwise decode for playback the video. Account module 82 can be configured to track a user account, access a user account, or otherwise manage one or more user accounts relative to gaming apparatus 10. User input module 84 can be configured to process signals and/or data received from user input elements (e.g., a lever, buttons, etc.) of the gaming apparatus. Gameplay logic module 85 may be configured to command the sequences of user and gaming apparatus activities during one or more games. For example, gameplay logic module 85 can be configured to cause the display to prompt a user for a bet, begin the randomizer, use the output of the randomizer to select one or more sets of video or images for playback on electronic display 62, check for one or more winning conditions, enter a winning mode when the one or more winning conditions are met, utilize an account module to associate a game outcome with a certain user, and the like. Gameplay module may also report bets and game outcomes to credit/debit module 86 which can be configured to debit (or credit) a user's account depending on the outcome of the game. Input received at card reader 91 (e.g., magnetic card reader, near-field communication reader, etc.) can be used to add or remove credits via credit/debit module 86. Credit/debit module 86 can also cause coin dispenser to dispense an appropriate winning for a user when a win state is entered. Audio system 92 can be controlled by processing circuit 61 (e.g., provided audio by video decoder 82) when video is played back or otherwise (e.g., to "ring" when a winning state is entered).

It should be noted that, according to various exemplary embodiments, the gaming apparatus (e.g., gaming device, slot machine, etc.) connected to a display includes any circuit configured to cause a character to be displayed on the display wearing multiple pieces of clothing, the circuit being configured to vary the pieces of clothing shown on the character when a game is played. In other words, it should be noted that while different portions and different images may be cycled through (e.g., randomized, jumbled, spun, etc.) the gaming apparatus may be configured to "land on" or otherwise select one video (which may be a winning video) for playback on the display. For example, rather than the cycle of different portions, a user may pull the lever and the character may begin dressing (or undressing) to reveal a winning (or losing) combination of pieces of clothing in full-motion video. Accordingly, processor 66 may be configured to determine if a user wins or not immediately (near immediately) when the user pulls a lever or otherwise activates the system. Depending on whether the user has won (and what the user has won), processor 66 will begin playing a video involving the character that will reveal (e.g., via what the character ends up wearing) whether the user has won. Accordingly, processor 66 may be configured to enter a winning state (e.g., a winning routine, which may include video playback, calculating a winning, showing the winning to the user, ringing bells, etc.), for the game when the pieces of clothing shown on the character match once the varying of the pieces of clothing is discontinued. In other embodiments the winning state may be entered when the user plays the game, with the display changing to make the user feel as if they are watching the determination in real time (e.g., even though it has already been determined). It should be noted that the winning state may be controlled by gameplay logic module 85 as shown with reference to FIG. 9 or may be controlled by one or more other logic modules (e.g., routines, computer code functions, etc.) in memory 75 of processing circuit 61. For example, gameplay logic module 85 may utilize randomizer 80 results, account module 83, and/or any number of other modules or calculations to determine if one or more conditions for entering a winning state exists. When the conditions for entering a winning state exist (e.g., when the video shown in the first, second, and third portions of a graphical scene are associated with the same character wearing matching clothing), gameplay logic module 85 may store data regarding the win state in memory (e.g., update one or more variables stored in memory), trigger one or more functions (e.g., a function to cause the display of a winning video, a function to calculate a user's winnings, a function to sound an alarm and flash lights on the slot machine, etc.). In other exemplary embodiments, entering a win state may trigger other parts of the game (e.g., a "bonus round," a multiplier routine, allow the user to "double-down" or otherwise increase his or her bet, or the like). In yet other embodiments, a winning state is entered whenever the conditions for a game win are determined by a processing circuit of the gaming apparatus.

The gaming apparatus as shown in the various exemplary embodiments is illustrative only. Although only a few embodiments have been described in detail in this disclosure, many modifications are possible. The position of elements may be reversed or otherwise varied and the nature or number of discrete elements or positions may be altered or varied. All such modifications are intended to be included within the scope of the present disclosure. The order or sequence of any process or method steps may be varied or re-sequenced according to alternative embodiments. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Other substitutions, modifications, changes, and omissions may be made in the design, operating conditions and arrangement of the exemplary embodiments without departing from the scope of the present disclosure.

Embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

What is claimed is:

1. A gaming apparatus, comprising:

an electronic display; and a circuit configured to operate the apparatus as a slot machine game, to control the electronic display and to cause the electronic display to display a full-motion video of an actor, wherein the circuit is further configured to use the full-motion video of the actor as the jumbled portion of the slot machine game, wherein the jumbled portion of the slot machine game comprises:

a first full-motion video portion comprising video corresponding to a first body portion of the actor, a second full-motion video portion comprising video corresponding to a second body portion of the actor, and a third full-motion video portion comprising video corresponding to a third body portion of the actor;

wherein the circuit is configured to jumble different possible videos for each of the first, second, and third full-motion video portions; and wherein the circuit is configured to enter a winning state when the full-motion video shown in the first, second, and third portions are associated with the same actor wearing matching clothing, wherein, when the slot machine game is active, the gaming apparatus does not include a graphical representation of a spinning area for the slot machine game that is separate from the full-motion video of the actor.

2. The gaming apparatus of claim 1, wherein the graphical display includes a fourth portion comprising full-motion video corresponding to a fourth body portion.

3. The gaming apparatus of claim 2, further comprising:

a user interface coupled to the circuit;

wherein the circuit is configured to receive the user selection of the one of a number of characters via the user interface.

4. The gaming apparatus of claim 3, wherein the fourth body portion is a head portion.

5. The gaming apparatus of claim 3, wherein the characters comprise videos of the same model dressed in the number of different costumes.

6. The gaming apparatus of claim 5, wherein the circuit is configured to cause the display of a video of the character performing an action sequence in response to the winning state.

7. The gaming apparatus of claim 6, wherein the circuit is configured to determine a payout in response to the win and the payout corresponds to a length of the action sequence.

8. The gaming apparatus of claim 7, wherein the character is a model in a cowgirl or cowboy costume and the action sequence includes bull riding.

9. The gaming apparatus of claim 7, wherein the character is a model in beach wear and the action sequence includes riding a wave.

10. The gaming apparatus of claim 7, wherein the circuit is configured to cause the display of a video of the character dancing when a win is determined.

11. The gaming apparatus of claim 1, wherein the circuit is configured to cause the electronic display to provide video of a model before beginning a game and wherein the circuit is configured to cause an audio system of the gaming apparatus to play audio corresponding the video, wherein the audio prompts passers-by or users to use the gaming apparatus.

12. The gaming apparatus of claim 11, wherein a first character is a model in a beach wear costume and a second character is a model in a cowboy or cowgirl costume.

13. The gaming apparatus of claim 1, wherein the circuit is configured to cause each of the first portion, the second portion, and the third portion to include an image and/or a video of a curtain, and wherein the circuit is configured to cause the each of the first portion, the second portion, and the third portion to change from including the image and/or video of the curtain to including video of the character.

14. The gaming apparatus of claim 1, further comprising:

a storage unit for storing a first set of videos associated with the first body portion in a plurality of costumes, a second set of videos associated with the second body portion in the plurality of costumes, and a third set of videos associated with the third body portion in the plurality of costumes, wherein the storage unit includes additional sets of videos for additional characters in the plurality of costumes.

15. A method of providing a game of chance via an electronic display, the method comprising:

causing the electronic display to display a full-motion video of an actor;

using the full-motion video of the actor as the jumbled portion of a slot machine game, wherein using the full-motion video of the actor as the jumbled portion of the slot machine game comprises, within the display of the full-motion video of the actor:

providing a first full-motion video portion corresponding to a first body portion of the actor;

providing a second full-motion video portion corresponding to a second body portion of the actor;

providing a third full-motion video portion corresponding to a third body portion of the actor; and wherein, when the slot machine game is active, the slot machine game does not include the display of a spinning area for the slot machine game that is separate from the full-motion video of the actor, and wherein the method further comprises providing an indication of a winner when the first video portion, the second video portion, and third video portion show the actor wearing matching clothing.

16. The method of claim 15, further comprising:

allowing selection of the actor from a plurality of possible selections.

* * * * *